June 4, 1935.  C. E. LUNDBERG  2,003,691
MEANS FOR PHOTOGRAPHIC COPYING
Filed Nov. 17, 1930  4 Sheets-Sheet 1
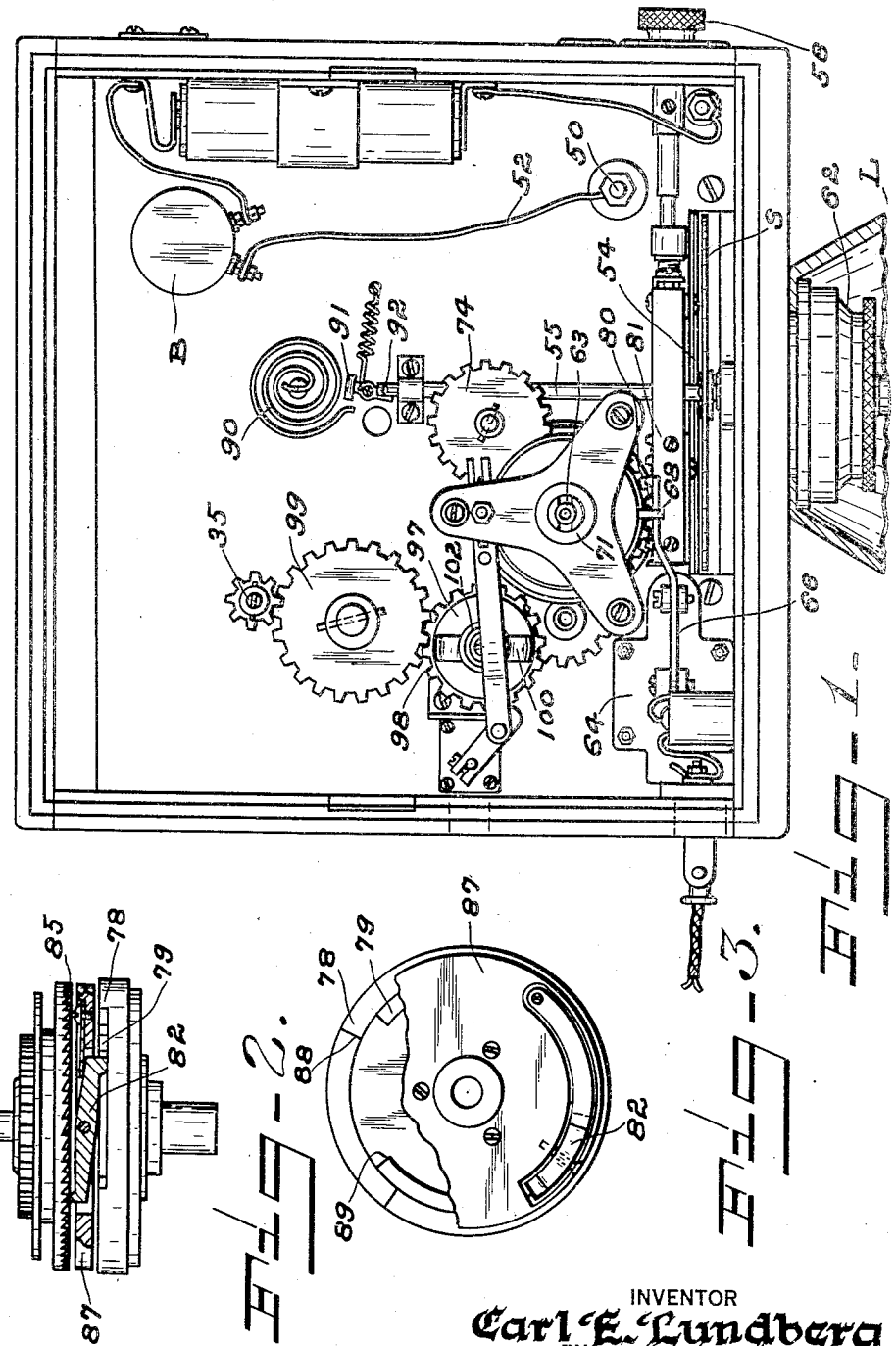
INVENTOR
Carl E. Lundberg
BY Smith & Tuck
ATTORNEYS

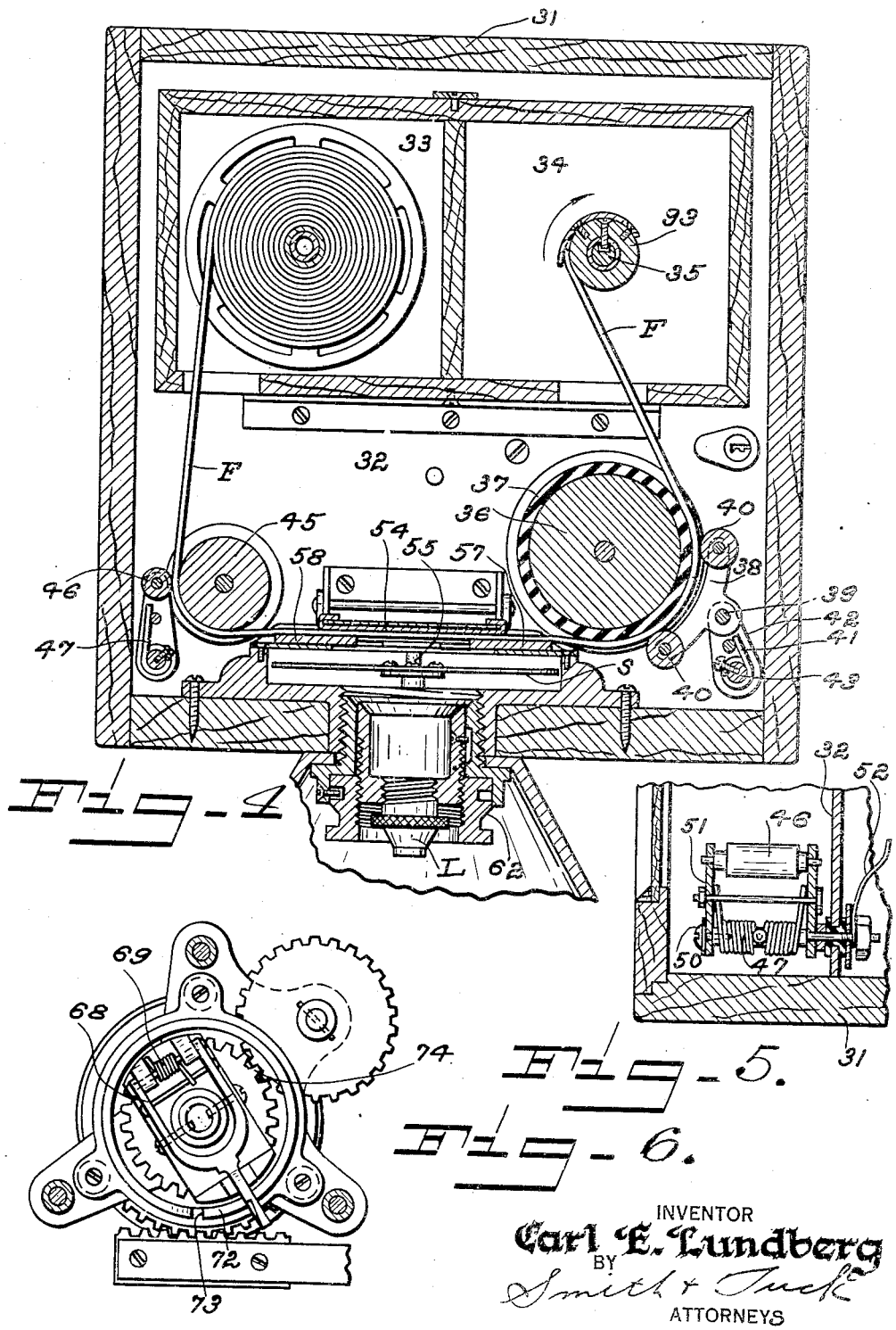

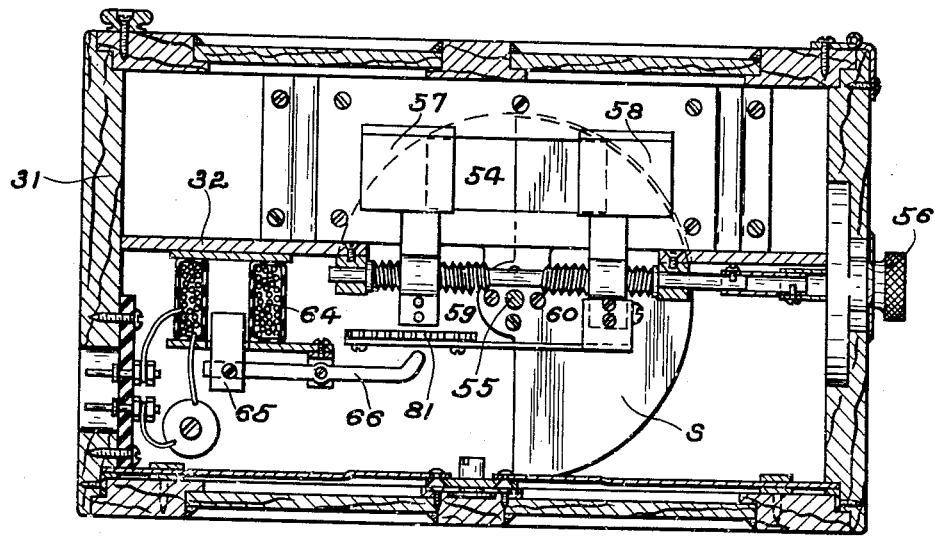
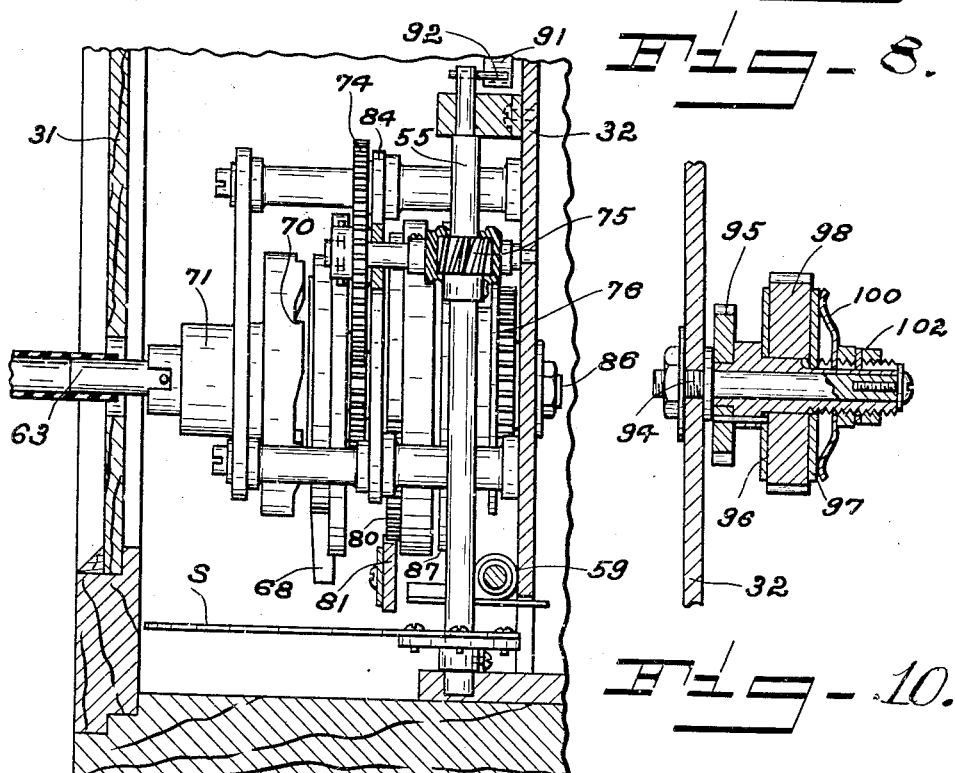

Patented June 4, 1935

2,003,691

UNITED STATES PATENT OFFICE 2,003,691

MEANS FOR PHOTOGRAPHIC COPYING

Carl E. Lundberg, Seattle, Wash.

Application November 17, 1930, Serial No. 496,196

5 Claims. (Cl. 95—34)

My present invention relates to the art of photographic equipment, and more particularly to means for photographic copying.

My invention consists of a number of related, co-acting parts which have been found essential in copying, particularly records at high speed, on a continuous film.

In my present invention I have arranged the necessary parts so that the records may be photographed upon a sensitized film of such small size that continuous film may be used. For this purpose I prefer to use film similar to the motion picture film, excepting that I have provided means which make it unnecessary to have the sprocket holes on the margin of the film, and I am thus able to use the entire width of the film. My equipment is further arranged so that these pictures may be taken with a speed of approximately 25 exposures per minute. This requires mechanism making the matter of timing the exposure, the movement of the film, etc., automatic. When the pictures have been so taken and the film developed, a permanent record is secured, which is so compact that, for instance, the contents of 72 legal record volumes of 640 pages each, when photographed on my continuous film, can be stored in a small sized safe deposit drawer. These prints are exceptionally legible, regardless of the color of ink used in the original, and large prints of the film records can be had at a fraction of the cost of photographic prints made by the contact method.

The operation of my device has been so perfected that an entire volume of 640 pages of legal records can be filmed in twenty minutes, therefore:

The principal object of my invention is to provide means whereby photographic copies can be made with a great saving in time.

A further object is to provide means whereby records may be photographed on a continuous film of small size.

A still further object is to provide means whereby the operation of my device is so simplified that even an inexperienced operator can satisfactorily copy records at high speed.

Other and more specific objects will be apparent from the following description taken in connection with the accompanying drawings, wherein:

Figure 1 is a rear view of my camera proper, with its back plate removed.

Figure 2 is a top plan view of my clutching arrangement, certain portions being broken away and sectioned to better illustrate the same.

Figure 3 is an end elevation of the mechanism illustrated in Figure 2 with the end plate broken away to better illustrate certain parts.

Figure 4 is a vertical, cross-sectional view taken through the plane of the lens, and illustrating the mechanism from the side opposite that shown in Figure 1.

Figure 5 is a fragmentary cross-sectional view showing my film pressure means in greater detail.

Figure 6 is an end elevation of my clutching mechanism with certain parts removed to better illustrate the construction.

Figure 8 is a horizontal cross-sectional view taken along the line 11—11 of Figure 1.

Figure 9 is a fragmentary cross-sectional view showing my clutch and shutter-drive means in side elevation.

Figure 10 is a fragmentary cross-sectional view showing my film tension means.

Figure 7:
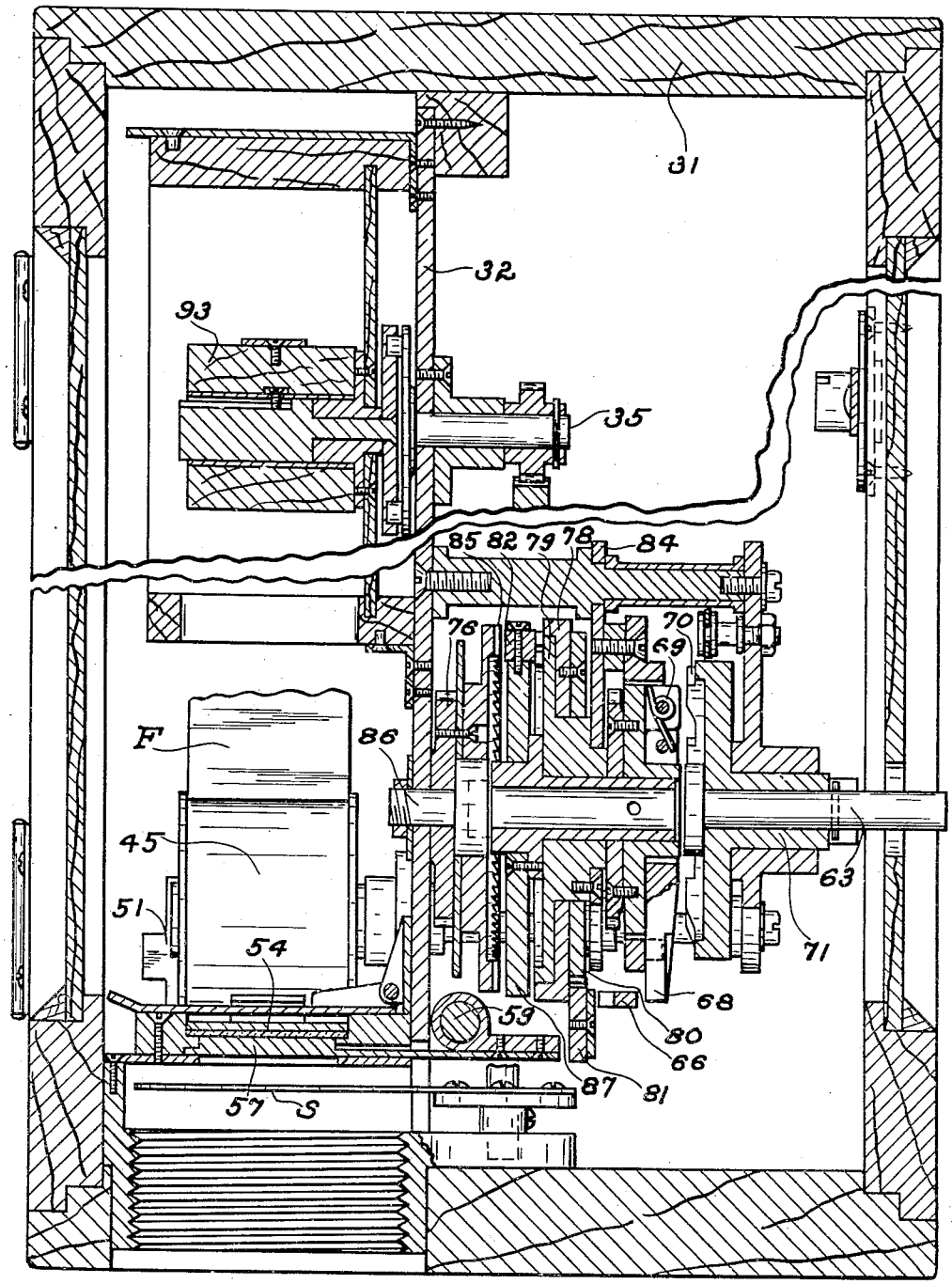
Figure 7 is a cross-sectional view taken at right angles to Figure 4.

My camera proper might be described briefly as having a casing 31 with a vertical partition across its longest dimension as 32. When viewed from one side we have the showing as in Figure 4, in which are disposed the lightproof film storage chambers 33 and 34, 33 holding the unexposed film while 34 has the driven shaft 35, upon which the exposed film is wound.

Disposed immediately below chamber 34 is the film moving roll 36. This is provided with a thick yieldable rubber covering which is intended to provide the necessary frictional engagement with the film F. In order to make sure that constant pressure will be provided to urge the film against the rubber ring, a pressing device is used, which consists of a member 38 pivoted at 39 and having the two idle rolls 40. This is constantly urged against roller 36 by action of spring 41, which is adapted to revolve arm 42 about its pivot 43.

Under compartment 33 is a second roll 45 which is merely an idler to properly direct the film, but which has also a further function in that the body of roll 45, or at least a covering thereon, is made of conductive metal, against which the metal roll 46 is urged by the coil spring 47. The exact construction of this member is best shown in Figure 5, which shows a central pin 50, about which arms 51 are free to revolve. Electrical connection is made to bolt 50 as by the wire 52. The purpose of this electrical connection is to indicate when all the unexposed film has passed this point. Normally rollers 45 and 46 are spaced apart by the film F, but as soon as the end of the film has passed between the two rollers they form a contact under the urge of spring 47 and energize an audible signal, not shown, thus making it known to the operator that no more pictures can be taken until the film is replaced.

The film passes through an aperture plate assembly 54, which is disposed between rollers 36 and 45. This serves, first, to hold the film in exact plane of registry and, second, forms a mask which is adjustable by means to be described, and which limits the amount of film exposed or in effect the size of the picture. Disposed immediately below the aperture plate is the rotary shutter S which is of the same general form normally used in most picture cameras, and may be best described as a semi-circle of opaque material, usually metal painted black, and which revolves with a driven shaft 55.

A better understanding of the aperture plate arrangement will be had by a study of Figures 4 and 11. Figure 8 shows the shutter and aperture plate in top plan view. When the camera is set up to take pictures of a given type of copy the film may be used as a ground glass for purposes of arrangement, or, as I have found more convenient, an index may be provided on the operating knob 56 which may be collaborated to match the grid or, as I have found most desirable, to measure the length of film exposed. By some such means or by actual focusing upon the film or upon a piece of ground glass, the two movable masks 57 and 58 are moved either toward or away from each other. They are controlled by the right and left hand screws 59 and 60, which in turn are operated by knob 56 so that each will be moved an equal distance away from or toward the axis of the lens. The setting of these masks will determine exactly the amount of film exposed.

Disposed immediately below the aperture plate is the photographic lens L, which may be provided with any suitable focusing mounting.

Most of the operating mechanism of my camera is located on the opposite side of the partition 32 from the aperture plate. This is best illustrated in the elevation shown in Figure 1, and the cross sections in Figures 7, 8, and 9.

A motor, not shown, is secured to the revolvable shaft 63 by means which permit the motor to vibrate without affecting the camera itself. This may be accomplished by a number of well known flexible couplings, or may be provided by a short piece of rubber tubing.

I provide that shaft 63 be driven at a constant speed and as it is desired to operate the different parts of my device intermittently I provide a clutch which is controlled by an electrically energized solenoid 64, having a core 65 secured to the pivoted arm 66.

When it is desired to take a picture electric contact is made by a suitable switch. The solenoid is then energized, which in turn operates arm 66, which causes the clutch to be engaged.

For sake of completeness I propose to explain the operation and construction of my clutch. However, I would not care to be limited to the clutch mechanism shown, as any type of clutch which will engage and disengage smoothly and without jar would be equally satisfactory. In my present construction arm 66 engages the clutch yoke 68 and forces it into engagement with the teeth 70 of the continuously driven member 71. Yoke 68 has at its pivotal point a spring 69 which is so disposed as to be constantly urging the yoke back to its normal position. The yoke, however, once it has been engaged is then raised up over the annular cam 72 and is then held against disengagement until it has completed one revolution. As the revolution is almost complete the cam surface gradually decreases in height and the arm of yoke 68 comes to rest against the square end 73 of cam 72.

This movement has been sufficient, however, to perform all the functions necessary to take a single picture and change the film ready for a new picture. (It entails revolving shutter S once, through suitable gearing, as the spur gearing 74 and the spiral gearing 75.) At the same time roller 36 has been revolved an amount sufficient to move the entire exposed film frame away from the aperture plate and place a fresh section of film in position for exposure.

This is accomplished through suitable gearing which meshes with the spur gearing 76. It must be remembered, however, that for various sized copy it is necessary to use different lengths of exposure frames, which means that sometimes roll 36 may need only move, say, 1½ inches of film, while in other cases it might have to move 2 or 2½ inches of film. This variation is taken care of by the means illustrated in Figures 2 and 3, with certain other co-acting parts.

This mechanism consists of two concentrically disposed annular cam members 78 and 79, which are mounted coaxially with shaft 63 and are driven when the clutch is engaged, as previously explained. The outer member 78 is held against rotation by having gear teeth cut therein for a portion of its circumference, as shown at 80 in Figure 1, and which in turn mesh with gear teeth cut in the form of a rack 81, and which, it will be observed in Figure 8, is secured to the adjustable member which controls the mask 58 and is in turn adjusted by knob 56.

A pivoted dog 82 is adapted to bear at one end on the cam faces 78 and 79. Both members 78 and 79 are held against rotation, the inner member by being secured as by screws to the frame member 84 and the outer member by the rack 81, as explained. Dog 82 engages at its opposite end a ratchet wheel 85. The ratchet wheel 85 is, with the gearing secured to it, independently supported from partition 32 by the stud 86, and will only be moved by the amount dog 82 moves it. Dog 82 is secured to a disc 87, which is adapted to revolve with the clutch. I feel it will be apparent that the angular travel wherein dog 82 will be free to engage ratchet 85, will be that between points 88 and 89, as shown in Figure 3. It will be further apparent then that by adjustment of member 78 this distance may be increased or decreased. As member 78 is controlled directly by the same mechanism which regulates the amount of opening of the aperture plate, this mechanism will, through its associated gearing, move roll 36 an amount to take up exactly the required amount of film after each exposure.

As a convenience to advise the operator when the picture has been taken, I provide a spring gong 90, arranged to be sounded by the striker 91 and which is in turn operated by a pin 92 secured in shaft 55. This is illustrated in Figures 1 and 9.

I further find it necessary to provide adjustable means for winding up the exposed film about shaft 35. I believe it will be apparent that as more film is wound about shaft 35, or more properly the spool 93 disposed thereupon, more film will be taken up for each revolution of the shaft. To provide means for overcoming this unequal situation I provide a friction drive for shaft 36 which is shown in section in Figure 10. This consists of a central spindle 94, upon which is revolvably mounted gear 95. This forms a positive drive with its associated gearing. To the mounting for gear 95 is secured a friction plate 96 and slidably secured thereto a second friction plate 97. Disposed between said friction plates is the driving gear 98, which in turn is adapted through the idler gear 99 to drive shaft 35. A spring friction drive 100 is adjustably secured by lock nuts 102. With this arrangement I provide gearing which is intended to drive shaft 35 at a speed which will take up the film as quickly as it is released by roll 36, even when starting the film. When considerable film has been wound upon spool 93 it will then be apparent that shaft 35 would revolve too fast. Under this condition gear 98 must slip in between its friction plates 96 and 97 and thus not break the film.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

What I claim is:—

1. In a photographic copying device employing a movable sensitized film, the combination of a case having a pair of separated chambers, a film feeding reel in one chamber and a take up roll in the other chamber, means for operating the take up roll, spaced guide rollers for the film, means located between said guide rollers for varying the length of film to be exposed, and a spring pressed roller co-acting with each guide roller for retaining the film on said rollers.

2. A photographic copying device employing a sensitized film and comprising a feed reel, a winding roll and operating means therefor, means for varying the speed of the operating means for controlling the movement of the roll to vary the length of the film-feed, and equalizing means coacting with the winding roll to compensate for the increasing diameter of the winding roll.

3. A photographic copying device employing a sensitized film and comprising a feed reel, a winding roll, a train of driving gears for operating said roll, one of said gears being a loose gear, a rotary driving plate having a resilient contact with said loose gear, and means for actuating the driving gears.

4. The combination in a photographic copying machine with a rotary shutter and operating means therefor, film feeding mechanism, and a constantly revolving drive shaft, of a clutch device interposed between the driving shaft and the shutter, mechanical connections for actuating the shutter, power transmitting mechanism between the shaft and the film feeding mechanism, and means for actuating the clutch.

5. The combination with a rotary shutter and operating means therefor, film feeding mechanism, and a constantly revolving drive shaft, of a clutch device interposed between the drive shaft and the shutter, a train of gears between the shaft and the film feeding mechanism, one of said gears being a loose gear and a rotary driving plate having a resilient driving contact with said gear, mechanical connections for actuating the shutter, and means for actuating the clutch.

CARL E. LUNDBERG.